United States Patent Office 3,414,513
Patented Dec. 3, 1968

3,414,513
PROCESS OF TREATING A DIGESTED DILUTED
SEWAGE SLURRY
Frank C. Buhl, Birmingham, Mich., and Ronald D. Lees, Wilmington, Del., assignors to Hercules Incorporated, Wilmington, Del., a corporation of Delaware
No Drawing. Filed Nov. 15, 1966, Ser. No. 594,399
7 Claims. (Cl. 210—54)

The present invention relates to sewage treatment, and more particularly to an improved process of removing suspended solids from an aqueous slurry of digested sewage which comprises aiding the separation of the solids from the water by adding a flocculating agent to the slurry.

In a typical sewage treatment plant the steps involved often include, in the order given, (1) primary sedimentation (usually after coarsely screening the raw sewage slurry through grit separators), (2) aeration, (3) digestion, (4) elutriation, (5) vacuum filtration, and (6) incineration.

The present invention is particularly applicable to substantially improving the elutriation step in the treatment of sewage, which, as indicated above, usually follows the digestion step. During digestion there is a huge drop in the concentration of the sewage solids and a substantial increase in the alkalinity of the sewage, the latter being due largely to bacterial action. This drop in slurry concentration and increase in alkalinity of the sewage are both very undesirable because they seriously complicate further treatment of the sewage. Reduction in slurry concentration greatly increases the cost of processing the sewage because of the large volume of water which must be handled, and the increase in alkalinity substantially increases the cost in that more chemicals are consumed in the subsequent treatment of the sewage. In view of this many sewage plants employ an intermediate step between the digestion step and vacuum filtration steps in order to minimize or eliminate these difficulties. This is known as the elutriation step. Elutriation comprises water washing of the sewage solids. This reduces the alkalinity of the sewage, and it also causes settling of some of the larger suspended solids and thus increases the slurry concentration. In carrying out the elutriation step, the sewage is diluted with about 1–6 parts of water per part sewage, the amount of water depending on the solids concentration. Then the sewage is pumped to settling tanks and allowed to stand for several hours. The solids are then further processed, e.g. as by vacuum filtration followed by incineration. The supernatant from the elutriation step is often discharged into natural streams or it may be pumped back to the beginning of the sewage treatment plant which is the primary sedimentation step.

At best the elutriation step is not as satisfactory as desired. It is quite time consuming. It is inefficient because the supernatant still contains far too many suspended solids.

In accordance with the present invention it has been found that carrying out the elutriation step in the presence of a small amount of a certain acrylamide-beta methacryloxyethyltrimethylammonium methyl sulfate (acrylamide-MTMMS) copolymer provides a highly effective and economical means of increasing the solids recovery and decreasing the "hold" time of this step. The particular copolymer of the present invention effects these substantial improvements by increasing the flocculation rate, floc size and floc density which in turn gives not only a substantially faster sedimentation rate but also gives an appreciable increase in percent total solids recovered. More particularly, in accordance with the present invention an aqueous slurry of digested sewage is diluted (elutriated) with water, mixed with the copolymer hereof and allowed to stand while the sewage solids settle.

The effectiveness of the particular copolymer of the present invention as a flocculant in the elutriation step of sewage treatment has been demonstrated both in the laboratory and in actual practice as experienced in sewage treatment plants.

The following examples illustrate various embodiments of the present invention. These examples are not intended to limit the present invention beyond the scope of the appended claims. In these examples and elsewhere herein parts and percent are by weight unless otherwise indicated.

EXAMPLES 1–6

Laboratory Runs—Settling

These examples were carried out in order to determine the effect of various polymeric flocculating agents on the settling characteristics of suspended solids in digested sewage sludge during the elutriation step.

Flocculating agent was added to each of several 300-ml. portions of digested sewage sludge which contained 20,830 p.p.m. suspended solids. Then each portion of this sewage was diluted (elutriated) with 400 ml. of sewage plant secondary effluent (i.e. supernatant water from the primary sedimentation tanks). The resulting approximately 700 ml. sewage slurries were placed in clean 1-liter glass beakers on a Phipps-Bird Flocculator. The slurries were stirred at 75 r.p.m. for 3 minutes. Stirring was dis-

TABLE 1.—LABORATORY RUNS, SETTLING

Effect of various polymeric flocculating agents on the settling characteristics of digested sewage sludge during the elutriation step

| Ex. No. | Flocculating agent | | Percent solids [2] settled | Ml. supernatant after 5 minutes | Turbidity of supernatant |
|---|---|---|---|---|---|
| | Name | Amount [1] | | | |
| 1 | None | None | 8.8 | None | Black. |
| 2 | Polyethylenimine.[3] | 5,000 | 14.5 | 7 | Do. |
| 3 | 96% acrylamide—4% MTMMS. | 250 | 93.2 | 284 | Milky, hazy. |
| 4 | do | 500 | 97.6 | 342 | Do. |
| 5 | do | 1,000 | 98.5 | 381 | Do. |
| 6 | do | 5,000 | 98.8 | 385 | Do. |
| 7 | 83% acrylamide—17% MTMMS. | 50 | 70.2 | 70 | Gray. |
| 8 | do | 250 | 91.3 | 250 | Milky, hazy. |
| 9 | do | 500 | 95.5 | 300 | Do. |
| 10 | do | 1,000 | 97.8 | 330 | Do. |
| 11 | do | 5,000 | 98.6 | 382 | Do. |
| 12 | do | 7,500 | 98.5 | 384 | Do. |
| 13 | 60% acrylamide—40% MTMMS. | 250 | 84.7 | 110 | Do. |
| 14 | do | 500 | 90.4 | 183 | Do. |
| 15 | do | 1,000 | 96.0 | 308 | Do. |
| 16 | do | 5,000 | 97.9 | 334 | Do. |

[1] P.p.m. dry weight basis by weight of total dry solids in sewage treated, added as a 0.1% aqueous solution.
[2] Based on solids of 20,830 p.p.m. in digested sewage sludge before elutriation.
[3] Flocculating agent available commercially as "Purifloc C-31".

continued and the slurries allowed to stand for 5 minutes. Then 25 ml. of supernatant was filtered through a weighed Gooch crucible. The crucible was oven dried 16 hours at 110° C. and reweighed to determine the percent total solids settled.

The beakers used are conventional and are designed specifically for use in this type flocculator. The Phipps-Bird Flocculator is conventional equipment widely used in this field. It consists simply of a bank of variable speed paddles and the beakers.

Further details appear in Table 1 above.

EXAMPLES 17–19

Sewage Plant Runs—Settling

These examples are similar to Examples 1–16 hereinbefore except they were carried out in a commercial sewage plant. Digested sewage sludge from the digestion step of the plant was continuously diluted with water in approximately a 1/1 ratio which reduced the solids concentration from about 50,000 to 25,000 p.p.m. The copolymer flocculating agent of the present invention was continuously added to the diluted (elutriated) sewage at a rate of approximately 3.4 lbs. per ton or 1700 p.p.m. by weight based on weight of total dry solids in the sewage. As will be seen from Table 2 hereinafter, without flocculating agent the solids settled from about 25,000 p.p.m. to about 2500 p.p.m., but with the aid of the particular copolymer flocculating agent of the present invention the solids settled from about 25,000 to about 500–600 p.p.m. within about 12 hours after the continuous addition of polymer was started. The amount of solids settled after 40 hours was 260 p.p.m.

Further details appear in Table 2 hereinafter.

se a part of the present invention. However, the preparation of said copolymer is quite important. In fact, applicants know of only one process which will produce a product having the properties of the particular copolymer applicable in the present invention. For the sake of completeness this process will now be disclosed. It may be referred to as precipitation polymerization.

The precipitation process broadly comprises polymerizing a solution of acrylamide and MTMMS monomers in aqueous tertiary butanol or aqueous acetone or aqueous tertiary butanol-acetone in the substantial absence of air while agitating the solution to give a copolymer product that can be isolated by filtration, the aqeuous tertiary butanol and aqueous acetone being solvents for the monomers but nonsolvents for the coplymer product.

Several of the conditions of this precipitation polymerization process are critical, and these conditions will now be discussed.

The solvent for the monomers must be aqueous tertiary butanol, aqueous acetone or aqueous tertiary butanol-acetone (i.e. mixtures of water and tertiary butanol or acetone alone or with both). The concentrations of water in said mixtures must be 30%–65%, preferably 45%–60%, by weight of said mixtures.

The polymerization reaction temperature must be 0° C.–60° C., preferably 0° C.–40° C.

The polymerization may be carried out either in the presence or absence of a polymerization catalyst (initiator), but preferably a polymerization initiator will be used. Both the types and amouts of free radical initiator applicable are well known in this art. Peroxygen compounds are quite suitable, including e.g. ammonium persulfate, potassium persulfate and hydrogen peroxide.

TABLE 2.—SEWAGE PLANT RUNS, SETTLING

Effect of flocculating agent of present invention on percent solids settled during elutriation of digested sewage

| Ex. No. | Flocculating agent | | Sampling time [2] | Suspended solids, p.p.m. | Percent solids [3] settled |
| --- | --- | --- | --- | --- | --- |
| | Name | Amount [1] | | | |
| 17 | 83% acrylamide—17% MTMMS. | 1,700 | Zero | 2,620 | 89.5 |
| 18 | do | 1,700 | 12 | 580 | 97.7 |
| 19 | do | 1,700 | 40 | 260 | 98.9 |

[1] P.p.m. dry weight basis by weight of total sewage treated, added as a 0.5% aqueous solution.
[2] A "Zero" sampling time simply means the point at which polymer addition was started.
[3] Based on influent solids of about 50,000 p.p.m.

From the foregoing examples it is readily apparent that the particular copolymer flocculating agent of the present invention, as compared with typical polymeric flocculating agents of the prior art, gives substantially improved flocculation both from the standpoint of increased rate of flocculation and total amount of suspended solids recovery. The amount of flocculating agent of the present invention required is also considerably less than that of the prior art. About 50–7,500 p.p.m., dry weight basis by weight of total sewage treated, of the particular copolymer flocculating agent of the present invention gives these improvements to a substantial degree. Preferably the amount of copoly flocculating agent used in accordance with the present invention will be about 500–2000 p.p.m. dry weight basis by weight of total sewage treated. Those skilled in the art to which this invention relates will appreciate that sewage systems vary tremendously and that the amount of any given flocculating agent employed will vary accordingly. The foregoing examples were carried out on the same sewage system.

The copolymer flocculating agent of the present invention consists by weight thereof essentially of 99%–20% acrylamide and 1%–80% MTMMS, preferably 97%–50% acrylamide and 3%–50% MTMMS, 95%–60% acrylamide and 5%–40% MTMMS being specifically preferred.

Preparation of the particular copolymer employed in the present invention is not claimed herein nor is it per Other free radical initiators include e.g. α,α'-azo-bis-isobutyronitrile. The peroxygen initiators may be used alone or in combination with activators (also well known in this art) including e.g. sodium bisulfite, sodium thiosulfate, tetramethylenediamine, thiourea and ferrous chloride, said combination forming a redox system. The amount of initiator usually will not exceed 0.5%, preferably is 0.05%–0.2%, 0.05% being specifically preferred by weight of the combined weight of monomers.

Although not necessary, preferably the precipitation polymerization is carried out in the presence of a salt dissolved in the polymerization reaction mixture. By polymerizing in the presence of a salt, or a buffer system comprising one or more salts in combination with another material to complete the buffer system, recovery of the copolymer product is substantially facilitated. These salts and buffer systems include, e.g., (1) alkali metal and ammonium acetates, carbonates, bicarbonates, chlorides, phosphates, sulfates, bisulfates, borates; (2) buffer systems comprising (a) mixtures of weak acid or weak base and their salts including (b) phthalates, citrates, borates, phosphates, acetates, ammonium hydroxide, ammonium acetate, ammonium chloride, (c) specific combinations including mixtures of boric acid-borax, citric acid-sodium acid phosphate, sodium carbonate-sodium bicarbonate, ammonium chloride-ammonium hydroxide, ammonium acetate-ammonium hydroxide; or (3) any combination of (1) and (2).

The amount of salt which may be used in about 0.1%–2.0%, preferably about 0.2%–0.7%, by weight of the reaction mixture. If the amount of salt exceeds about 2.0%, usually there is a tendency for the granules of the polymeric product to agglomerate in the polymerization reaction mixture. The manner of adding the salt and the point at which it is added are not critical.

The following is a specific example wherein the precipitation process was used in preparing the particular copolymer applicable in the present invention.

To a glass reactor were charged 116 parts of distilled water, 104 parts of acrylamide, 129 parts of tertiary butanol, 3.9 parts of Tergitol–14 (nonphenyl polyethylene glycol ether), 92.4 parts of a 23% aqeuous solution of MTMMS, and 0.05 part of potassium persulfate. The pH was adjusted to 5.3 by addition of $NH_4OH$. The solution was heated to 45° C. The atmosphere and dissolved air were replaced with nitrogen by a series of evacuations and repressurizations. The pressure was then adjusted to 148 mm. to maintain reflux at 45° C. Then 6.26 parts of a 1% aqueous solution of tetramethylethylenediamine was added at a uniform rate during 1.5 hours. Refluxing the reaction mixture was continued for an additional 1.5 hours. Polymerization occurred and the copolymer precipitated during this 3-hour period. The copolymer was washed with acetone and dried in a vacuum oven at 50° C. There was obtained 130 parts of copolymer containing 93.5% solids. It contained 19 weight percent MTMMS and 81 weight percent acrylamide (dry basis).

Although the flocculating agent in accordance with the present invention may be added in dry form to the sewage being treated, it is preferred to add it as an aqueous solution in order to get faster and more complete dispersion thereof throughout the sewage slurry.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. Process of treating a digested diluted sewage slurry which comprises contacting said sewage slurry with an acrylamide-beta methacrylyloxyethyltrimethylammonium methyl sulfate copolymer, thereby (1) increasing the rate at which suspended solids flocculate and settle out of said sewage and (2) increasing the amount of suspended solids which flocculate and settle out.

2. Process of claim 1 wherein the copolymer consists by weight thereof essentially of 99%–20% acrylamide and 1%–80% beta methacrylyloxyethyltrimethylammonium methyl sulfate.

3. Process of claim 1 wherein the copolymer consists by weight thereof essentially of 97%–50% acrylamide and 3%–50% beta methacrylyloxyethyltrimethylammonium methyl sulfate.

4. Process of claim 1 wherein the copolymer consists by weight thereof essentially of 95%–60% acrylamide and 5%–40% beta methacrylyloxyethyltrimethylammonium methyl sulfate.

5. Process of treating a digested diluted sewage slurry which comprises stirring a mixture of said sewage slurry and a small amount of an acrylamide-beta methacrylyloxyethyltrimethylammonium methyl sulfate copolymer, thereby (1) increasing the rate at which suspended solids flocculate and settle out of said sewage and (2) increasing the amount of suspended solids which flocculate and settle out.

6. Process of claim 5 wherein the amount of said acrylamide - beta methacrylyloxyethyltrimethylammonium methyl sulfate copolymer employed is about 50–7500 p.p.m., dry weight basis by weight of the total sewage treated.

7. Process of claim 5 wherein the amount of said acrylamide - beta methacrylyloxyethyltrimethylammonium methyl sulfate copolymer employed is about 500–2000 p.p.m., dry weight basis by weight of the total sewage treated.

References Cited

UNITED STATES PATENTS

| | | |
|---|---|---|
| 2,794,015 | 5/1957 | Jackson et al. |
| 3,171,805 | 3/1965 | Sven et al. _____ 210—54 |
| 3,280,081 | 10/1966 | LaCombe et al. |

MICHAEL E. ROGERS, *Primary Examiner.*